United States Patent
Muraoka

(10) Patent No.: US 7,684,819 B2
(45) Date of Patent: Mar. 23, 2010

(54) UPLINK TRANSMISSION POWER CONTROL IN A CDMA BASE STATION

(75) Inventor: Shinya Muraoka, Minato-ku (JP)

(73) Assignee: NEC Corporation, Tokyo (JP)

( * ) Notice: Subject to any disclaimer, the term of this patent is extended or adjusted under 35 U.S.C. 154(b) by 1078 days.

(21) Appl. No.: 11/350,874

(22) Filed: Feb. 10, 2006

(65) Prior Publication Data

US 2006/0183496 A1    Aug. 17, 2006

(30) Foreign Application Priority Data

Feb. 14, 2005    (JP)    ............................. 2005-036003

(51) Int. Cl.
*H04B 7/00* (2006.01)
(52) U.S. Cl. .................................... 455/522; 455/561
(58) Field of Classification Search ................ 455/522
See application file for complete search history.

(56) References Cited

U.S. PATENT DOCUMENTS

| | | | | |
|---|---|---|---|---|
| 6,580,745 | B1 * | 6/2003 | Kondo | 375/130 |
| 6,728,226 | B1 * | 4/2004 | Naito | 370/328 |
| 2002/0101832 | A1 | 8/2002 | Chen et al. | |
| 2004/0223468 | A1 * | 11/2004 | Benco et al. | 370/329 |
| 2006/0183496 | A1 * | 8/2006 | Muraoka | 455/522 |

FOREIGN PATENT DOCUMENTS

| | | |
|---|---|---|
| EP | 1 139 685 A1 | 10/2001 |
| JP | 11-275639 A | 10/1999 |
| JP | 2000-244391 A | 9/2000 |
| JP | 2000-244391 A | 9/2000 |
| JP | 2004-88696 A | 3/2004 |

* cited by examiner

*Primary Examiner*—Yuwen Pan
*Assistant Examiner*—Ankur Jain
(74) *Attorney, Agent, or Firm*—Sughrue Mion, PLLC

(57) ABSTRACT

A CDMA base station is disclosed that prevents significant increase in the amount of interference within an entire cell even when there exist in the cell mobile stations that perform high-speed packet communication. The CDMA base station comprises a noise estimation circuit, a noise comparator and a TPC bit generating circuit. The noise comparator receives noise power N1 estimated by the noise estimation circuit, compares the noise power N1 with a threshold N2 for interference supplied from packet communication circuit 1 and outputs the result of comparison N3 to the TPC bit generating circuit. The TPC bit generating circuit sets TPC2=0, outputting TPC command TPC2 to direct a TPC multiplex circuit to reduce the transmission power, without using TPC command TPC1 from a SIR estimation circuit when the increase in the transmission power of a mobile station that is performing high-speed packet transmission within a fixed period of time has exceeded the threshold for the increase or when the amount of interference in the entire cell has exceeded the threshold for the amount of interference.

3 Claims, 4 Drawing Sheets

UPLINK TRANSMISSION POWER CONTROL IN A CDMA BASE STATION

BACKGROUND OF THE INVENTION

1. Field of the Invention

The present invention relates to a CDMA base station and a method of performing uplink transmission control (TPC: Transmission Power Control) to control uplink transmission power from mobile stations.

2. Description of the Related Art

Recently, as communication technologies used for mobile communications systems, much attention has been focused on CDMA (Code Division Multiple Access) communication technology, which is robust against interference and disturbance. This CDMA communication technology is a communication scheme in which on the transmitter side a user signal to be transmitted is spread by spread coding and transmitted and on the receiver side the user signal is despread using the same spread coding as the former spread coding to obtain the original user signal.

In the CDMA communication, a plurality of transmitter sides perform spread by using different spread codes that are orthogonal to each other while the receiver sides identify respective communications by selecting the corresponding spread codes used for despreading, making it possible to share the same frequency band among communications.

However, since it is difficult to maintain perfect orthogonality among all the spread codes being used, the practical situation is that the spread codes are not perfectly orthogonal to each other but have correlated components with other codes. For this reason, these correlated components act as interference components against individual communications, causing degradation of communication quality. Since interference components are caused in this way, the interference components are compounded with the number of communications. Accordingly, if the transmission powers of all mobile stations are set at a fixed level, the radio waves from mobile stations near the base station are too strong, so that the signals from mobile stations remote from the base station are greatly subjected to interferences thereby, causing the so-called near-far problem. To address this problem, uplink transmission power control has been performed for adjusting the transmission powers of uplink signals from mobile stations to base station to appropriate values.

FIG. 1 shows a configuration of a conventional CDMA base station that performs such uplink transmission power control. As shown in FIG. 1, the conventional CDMA base station comprises packet communication circuit 1, a plurality of CDMA modulating and demodulating circuits 32, RF converter 3, multiplex circuit 4, and antenna 5, Each CDMA modulating and demodulating circuit 32 comprises demodulator 6, modulator 7, separating circuit 8, data decoder 9, signal power estimation circuit 10, noise estimation circuit 11, SIR estimation circuit 12, TPC multiplex circuit 15, scheduling signal multiplex circuit 16 and data encoder 17.

RF converter 3 converts an uplink signal in the RF band that is input via antenna 5, into digital signal R1 in the baseband, and supplies it to demodulator 6 in each CDMA modulating and demodulating circuit 2. It also converts code-multiplexed signal T1 from multiplex circuit 4 into the signal in the RF band and outputs the resultant signal to antenna 5.

Multiplex circuit 4 performs code-multiplexing of each baseband signal T2 transmitted from modulator 7 in each CDMA modulating and demodulating circuit 32 and outputs the resultant signal T1 to RF converter 3.

Demodulator 6 performs pass-search, rake synthesis and despread on digital signal R1 from RF converter 3, and outputs uplink separate CH (R2) and packet CH (PKT1) to separating circuit 8 and packet communication circuit 1, respectively.

Transmitted from a mobile station to the CDMA base station are two uplink signals: separate uplink CH (channel) and packet CH (channel) having the configurations as illustrated in FIG. 2. FIG. 2 illustrates the configuration of the uplink signals in a W-CDMA (Wide band-CDMA) scheme.

As shown in FIG. 2, separate CH is composed of a pilot signal (Pilot), a packet request signal (RQ) and a data section, while packet CH is composed of packet data alone. Packet CH is used only for high-speed packet communication. The CHs shown in FIG. 2 all have slot configurations, and transmission power control over uplink separate CH and packet CH is also made in slot units. Transmitted from the base station to the mobile stations is the downlink separate CH shown in FIG. 2. This CH is composed of a pilot signal, a scheduling signal (SC) and a data section.

Separating circuit 8 separates the blocks of the uplink separate CH (R2) from demodulator 6 and outputs data block ULD1 to data decoder 9, pilot signal P1 to signal power estimation circuit 10 and noise estimation circuit 11, request signal RQ1 indicative of the packet transmission request from the mobile station to packet communication circuit 1.

Data decoder 9 performs error correction decoding on data block ULD1 supplied from separating circuit 8, in a predetermined manner and outputs the result ULD2 to an external data processor.

Signal power estimation circuit 10, based on pilot signal P1 supplied from separating circuit 8, estimates the signal power of the uplink signal from the mobile station and outputs the estimated uplink signal power S1 to SIR estimation circuit 12.

Noise estimation circuit 11, based on pilot signal P1 supplied from separating circuit 8, estimates the noise power of the uplink signal from the mobile station and outputs the estimated noise power N1 to SIR estimation circuit 12.

SIR estimation circuit 12 estimates a signal to interference power ratio (SIR) from uplink power signal S1 from signal power estimation circuit 10 and noise power N1 supplied from noise estimation circuit 11, and compares the result of estimation with a predetermined target SIR and outputs the result of comparison to TPC multiplex circuit 15 as TPC command TPC1. If the signal to interference ratio obtained from SIR estimation circuit 12 is greater than the target SIR, the TPC command is "0", and If the signal to interference ratio obtained from SIR estimation circuit 12 is less than the target SIR, the TPC command is "1". That is, TPC command TPC1 carrying "0" acts as a command to direct the mobile station to reduce the transmission power and TPC command TPC1 carrying "1" acts as a command to direct the mobile station to increase the transmission power.

Upon receipt of request signal RQ1 from separating circuit 8, packet communication circuit 1 determines whether the request should be accepted or not, based on a predetermined algorithm. Packet communication circuit 1 then outputs the result as scheduling information SC1 to scheduling signal multiplex circuit 16. Further, packet communication circuit 1 performs error correction decoding on high-speed packet signal PKT1 from the mobile station with a predetermined scheme and outputs the result PKT2 to the external data processor.

Data encoder 17 encodes data DLD1 for the mobile station, supplied from the external data processor, with a predetermined scheme and outputs the result as encoded data DLD2 to scheduling signal multiplex circuit 16.

Scheduling signal multiplex circuit 16 multiplexes scheduling information SC1 supplied from the packet communication circuit with encoded data DLD2 supplied from data encoder 17, and outputs the result DLD3 to TPC multiplex circuit 15.

TPC multiplex circuit 15 multiplexes TPC command TPC1 supplied from SIR estimation circuit 12 with DLD3 supplied from scheduling signal multiplex circuit 16 and outputs the result as data DLD4 to modulator 7.

Modulator 7 modulates data DLD4 supplied from TPC multiplex circuit 15 with a predetermined scheme and outputs the result as base band signal T2 to multiplex circuit 4.

As described above, in the conventional closed loop transmission power control performed in the CDMA base station, the increase or decrease in the transmission power of the mobile station was controlled by comparing the received SIR with a predetermined threshold. However, since SIR is a signal interference power ratio, if the amount of interference increases, then SIR is lowered, so that the base station performs control to direct the mobile station to increase the transmission power. This control is performed on all the mobile stations, tending to increase the amount of interference in the entire cell.

In order to remedy such deficiencies, a variety of closed-loop uplink transmission power control methods have been proposed (see JP11-275639A and JP2000-244391A, for example). However, none of these conventional uplink transmission power control methods do not take into consideration the case where there exists a mobile station(s) in the cell that performs uplink high-speed packet communication. Accordingly, the use of the conventional uplink transmission power control method renders the above deficiencies more conspicuous when there exist a mobile station(s) in the cell that performs uplink high-speed packet communication. When high-speed packets are transmitted from a mobile station, the transmission usually needs to be performed with a higher power than usual in order to secure transmission quality. This in turn leads to the increase in the amount of interference for other mobile stations. Therefore, when closed loop transmission power control is being performed in the uplink communication between the base station and a mobile station (from the mobile station to the base station), the transmission powers of other mobile stations are also increased in order to secure transmission quality. As a result, the amount of interference is also increased for the mobile station that is transmitting high-speed packets, further increasing the transmission power. This results in the increase in the transmission power, which causes a problem of increasing the amount of interference in the entire cell.

Since in the CDMA communication system the number of mobile stations that can be accommodated is determined by the amount of interference in the cell, the increase in the amount of interference in the entire cell leads to the decrease in the number of mobile stations that can be accommodated. To avoid this, it is common to previously determine a threshold of an amount of interference for the entire cell with which a predetermined number of mobile stations can perform communications, and perform high-speed packet communications within the threshold for the amount of interference. However, as discussed above, the presence of high-speed packets increases the amount of interference in the entire cell. In order not to reduce the number of mobile stations that can be accommodated even in that case, provision needs to be provided to lower the threshold for the amount of interference and to avoid reduction in the number of mobile stations that can be accommodated even with the slight increase in the amount of interference. However, the lowering the threshold of the amount of interference presents the problem of lowering the efficiency of use rate of communications in a cell.

SUMMARY OF THE INVENTION

It is an object of the present invention to provide a CDMA base station and uplink transmission power control method, wherein the amount of interference in the entire cell will not increase significantly even when there exist mobile stations in the cell that perform high-speed packet communications.

In the present invention, instead of outputting the TPC command output from a SIR estimation circuit as it is to a TPC multiplex circuit, a TPC bit generating circuit generates a final TPC command to a mobile station based on the TPC command output from a SIR estimation circuit, the comparison result from a noise comparator and the scheduling information supplied from a packet communication circuit, and outputs it to a TPC multiplex circuit. This makes it possible to perform such a control as to store the increase or decrease of transmission power of a mobile station that carries out high-speed communication for a fixed period of time and to reduce its power transmission when the increase exceeds a predetermined level, preventing a significant increase in the amount of interference in the entire cell. In addition, control is performed wherein the amount of interference in the entire cell at that time is compared with a predetermined threshold for the amount of interference, and if the amount of interference exceeds the threshold, the transmission power of the mobile station is reduced. This makes it possible to prevent a significant increase in the transmission power of the mobile station that is performing high-speed packet communication and to limit the amount of interference in the entire cell within the aforementioned threshold.

The above and other objects, features and advantages of the present invention will become apparent from the following description with reference to the accompanying drawings which illustrate examples of the present invention.

DESCRIPTION OF THE PREFERRED EMBODIMENT

The present invention is premised on the assumption that a base station and mobile stations perform wireless communication using CDMA scheme and that closed-loop uplink transmission power control is performed between the base station and mobile stations.

Figure 1:
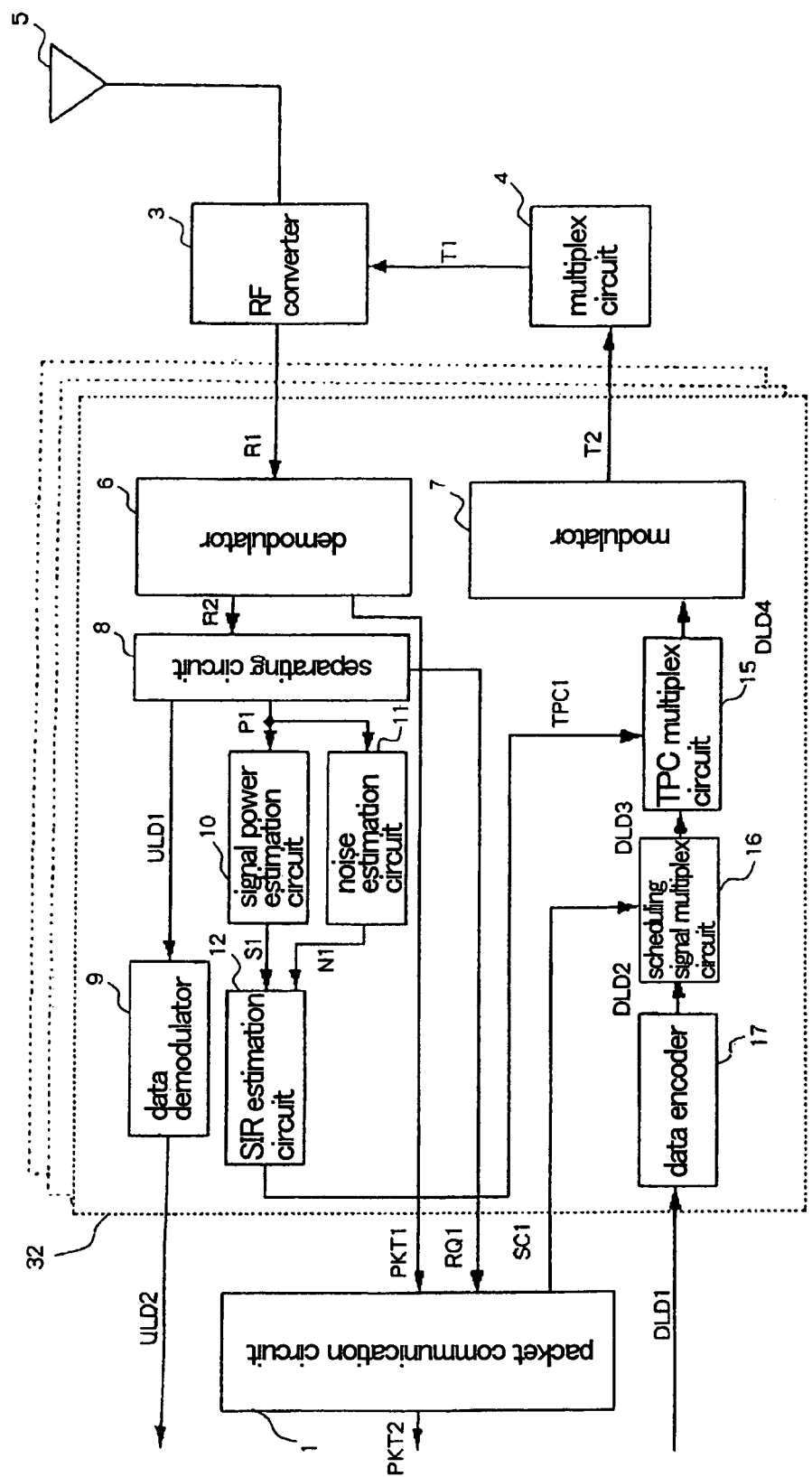
FIG. 1 is a block diagram of a conventional CDMA base station.
Figure 2:
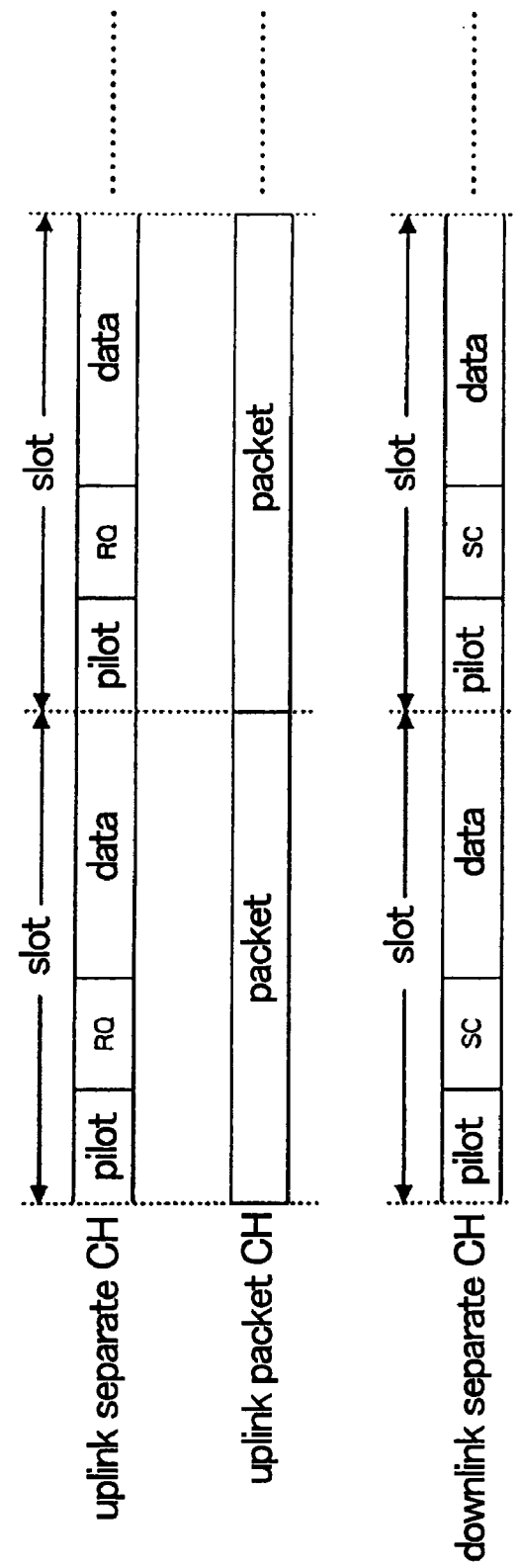
FIG. 2 is a view illustrating structures of uplink separate CH and packet CH, transmitted from a mobile station to a CDMA base station.
Figure 3:
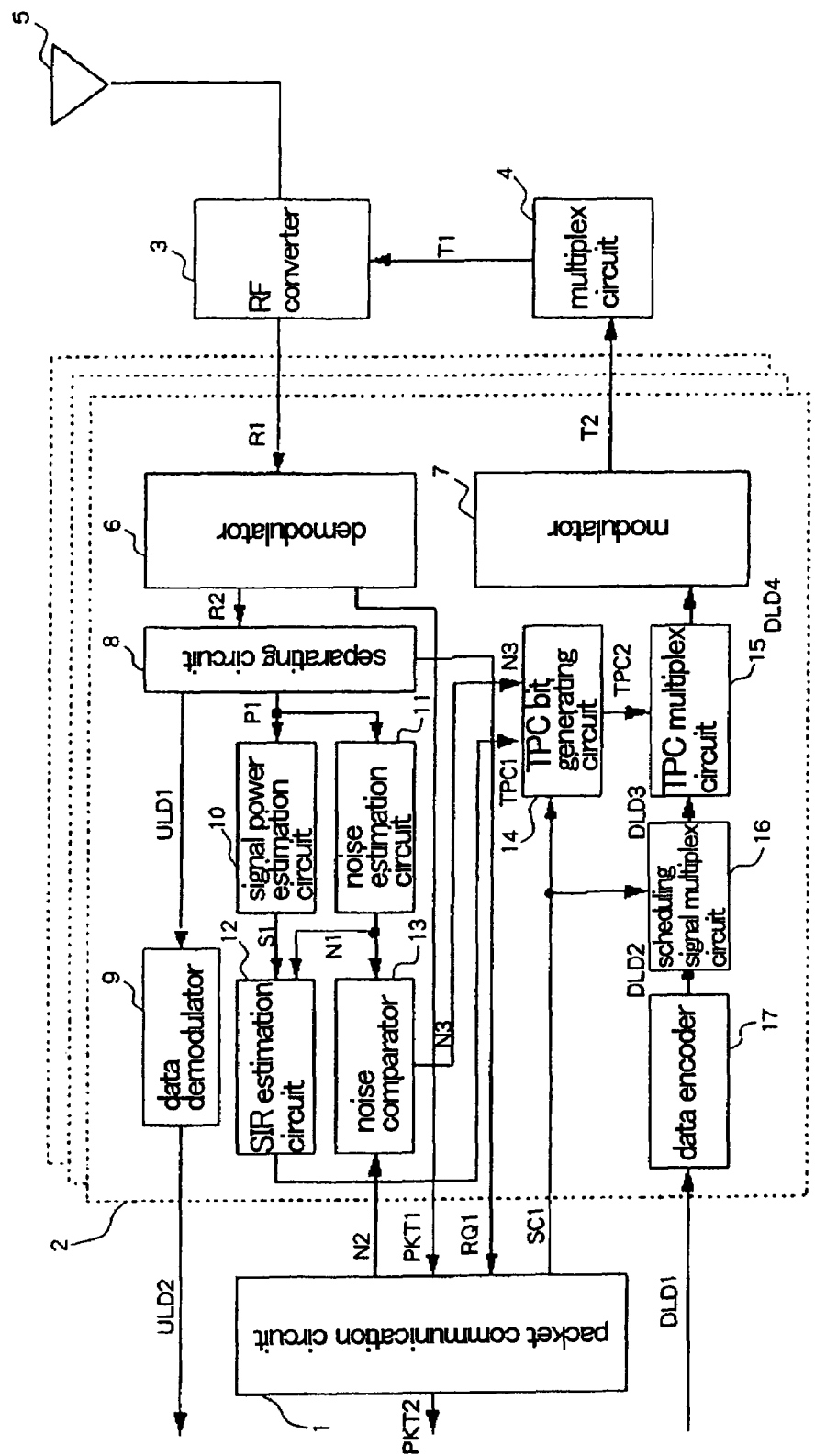
FIG. 3 is a block diagram of a CDMA base station according to a first embodiment of the present invention.

Referring to FIG. 3, there is shown a CDMA base station system according to an embodiment of the present invention, comprising packet communication circuit 1, a plurality of CDMA modulating and demodulating circuits 2, RF converter 3, multiplex circuit 4, and antenna circuit 5. In FIG. 3 the same components as those in FIG. 1 are assigned the identical reference numerals and hence their descriptions are omitted.

Each CDMA modulating and demodulating circuit 2 includes demodulator 6, modulator 7, separating circuit 8, data decoder 9, signal power estimation circuit 10, noise estimation circuit 11, SIR estimation circuit 12, noise comparator 13, TPC bit generating circuit 14, TPC multiplex circuit 15, scheduling signal multiplex circuit 16 and data encoder 17. CDMA modulating and demodulating circuit 2 of the present embodiment is different from CDMA modulating and demodulating circuit 32 in the conventional CDMA base station system shown in FIG. 1, in that it further includes noise comparator 13 and TPC generating circuit 14.

Packet communication circuit 1 determines a threshold N2 for an amount of interference in the entire cell that assures the reception quality of separate CHs and packet CHs from each mobile station, and outputs the threshold N2 to noise comparator 13.

Noise comparator 13 receives noise power N1 estimated by noise estimation circuit 11, compares noise power N1 with the threshold N2 supplied from packet communication circuit 1 and outputs the result N3 to TPC bit generating circuit 14.

Based on TPC command TPC1 supplied from SIR estimation circuit 12, result N3 from noise comparator 13 and scheduling information SC1 supplied from packet communication circuit 1, TPC bit generating circuit 14 generates final TPC command TPC2 to the mobile station and outputs it to TPC multiplex circuit 15.

Specifically, TPC bit generating circuit 14, based on scheduling signal SC1 supplied from packet communication circuit 1, determines whether or not the mobile station whose transmission power control is to be made performs high-speed packet communication. If it is determined that the mobile station does not perform high-speed packet communication, then TPC bit generating circuit 14 outputs TPC command TPC1 from SIR estimation circuit 12 as it is as final TPC command TPC2 to TPC multiplex circuit 15. If on the other hand, it is determined that the mobile station performs high-speed packet communication, TPC bit generating circuit 14 outputs as final TPC command TPC 2, a TPC command (TPC2=0) to reduce the transmission power, if the result of comparison N3 from comparator 13 shows that the current amount of interference N1 in the entire cell exceeds the threshold N2. If the current amount of interference N1 in the entire cell is equal to or less than the threshold N2, then TPC bit generating circuit 14 adds together the TCP command (TPC1="1") to increase the transmission power, for a fixed period of time at a time interval T1, from among TPC command TPC1 output from SIR estimation circuit 12, to calculate the transmission power increase TPC3 within the fixed period of time. When the transmission power increase TPC3 exceeds a predetermined threshold for increase TPC4, TPC bit generating circuit 14 outputs as final TPC command TPC 2, a TPC command (TPC2=0) to reduce the transmission power. When the transmission power increase TPC3 has not exceeded threshold TPC4, TPC bit generating circuit 14 outputs TPC command TPC1 from SIR estimation circuit 12 to TPC multiplex circuit 15 as it is, as final TPC command TPC 2

TPC multiplex circuit 15 in the present embodiment multiplexes TPC command TPC2 from TPC bit generating circuit 14 with DLD3 from scheduling signal multiplex circuit 16, and outputs the result as data DLD4 to modulating circuit 7.

The operation of the CDMA base station system of the present embodiment will next be described in detail with reference to the drawings.

The closed-loop transmission power control performed between the base station and mobile stations is such that when TPC2 received by the mobile station is "0", transmission power is reduced, and vice versa, as is conventional in the art.

For a high-speed packet communication, if a significant data occurs in the mobile station, a request signal is transmitted by using the aforementioned RQ1 to the base station. Upon receipt of the signal, packet communication circuit 1 determines in accordance with a predetermined manner whether or not this request is accepted. If it is determined that the request is accepted, the transmission timing and transmission scheme are multiplexed as scheduling signal SC1 with the downlink signal, and the multiplexed signal is received by the mobile station, which then starts packet communication. The transmission scheme contained in scheduling signal SC1 includes the number of spread codes used for packet CH, the code number, the band spread ratio and the transmission power offset value for the separate CH. Thus, transmission powers of the separate CH and packet CH, transmitted from the base station are defined as follows:

Separate CH: $PWR1(T)=PWR(T-1)+\Delta 1 \times (TPC)$,

Packet CH: $PWR2(T)=PWR1(T)+\Delta 2$.

The above $\Delta 1$ is an offset value determined by TPC2, and $\Delta 2$ is an offset value for the separate CH designated by the aforementioned scheduling signal SC1. This means that power variations due to uplink transmission power control of the separate CH will also affect the packet CH and the transmission power of the packet CH can be controlled by uplink transmission power control of the separate CH in a similar manner.

Figure 4:
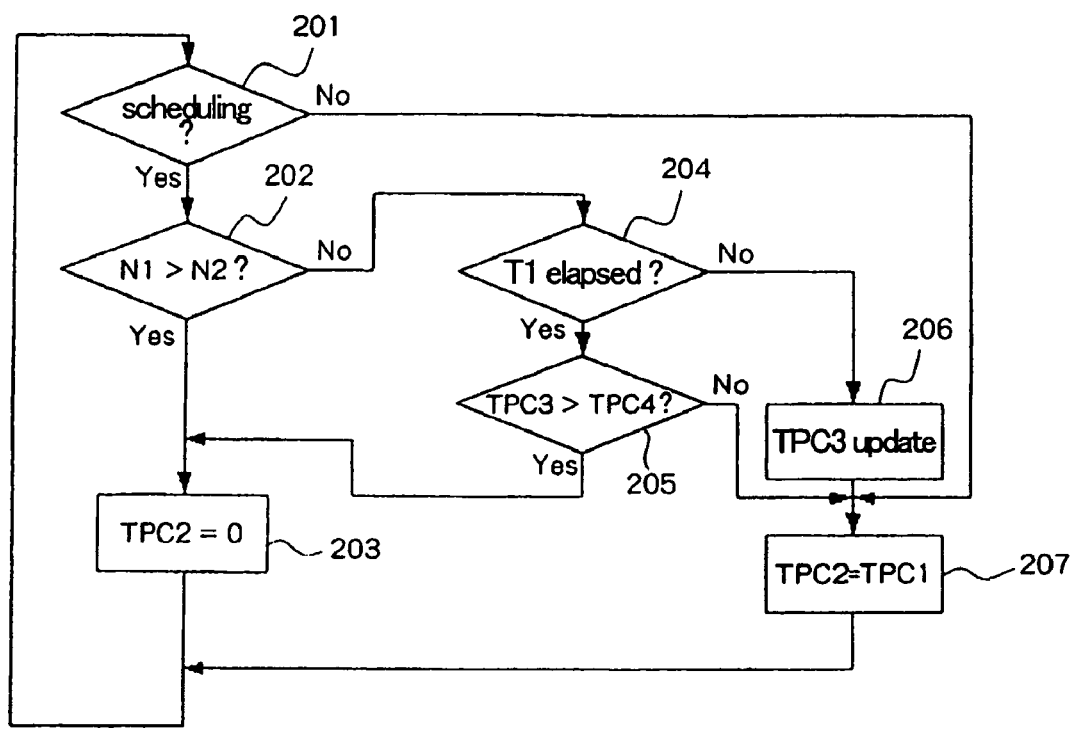
FIG. 4 is a flowchart illustrating the operation of TPC bit generating circuit 14 shown in FIG. 1.

The operation to reduce the transmission power variation of the packet CH that is performed in TPC bit generating circuit 14 will be described below with reference to FIG. 4. FIG. 4 is a flowchart illustrating the operation of TPC bit generating circuit 14, the operation being carried out for each slot.

TPC bit generating circuit 14 is supplied with scheduling signal SC1 indicative of whether or not the mobile station performs high-speed packet communication, from packet communication circuit 1. Upon receipt of the notice of "no scheduling" by scheduling signal SC1 at Step 201, TPC bit generating circuit 14 set TPC2=TPC1 at Step 207.

At Step 201, when "scheduling" is notified, TPC bit generating circuit 14 examines the result of comparison between the current] total amount of interference N1 and threshold N2 for the amount of interference, from signal N3 from noise comparator 13. If N>N2, since this indicates that the current total amount of interference amount N1 has already exceeded the threshold N2 for the amount of interference determined by packet communication circuit 1, TCP2 is set to 2 at Step 203, causing the transmission powers of separate CH and packet CH in the mobile station to be reduced until N2≧N1. This procedure makes it possible to reduce the amount of interference in the entire cell to threshold N2 or lower.

If N2≧N1 at Step 202, a test is made at Step 204 to determine what time has elapsed since the scheduling was started. If it is determined at Step 204 that the time elapsed does not exceed a predetermined period of time T1, the value of TPC3 internally stored during the scheduling is updated in the following manner at Step 206, and then TPC1 is set to TPC2 at Step 207.

$TPC3(T)=TPC3(T-1)+TPC1$

When the time elapsed from the time the scheduling is started has exceeded the aforementioned period T1, at Step 205 the previous TPC3 is compared with the predetermined threshold, i.e., increase threshold TPC4. When TPC3>TPC4, TPC2=0 is set and output at Step 203. The objective of performing such procedure is to limit the maximum increase in the transmission power of the separate CH and the packet CH from the mobile station within a fixed period of time, thereby to inhibiting significant increase in the transmission power during the scheduling.

That is, TPC3(0)=0 is set whereby the number of times TPC command TPC1 from SIR estimation circuit 12 was "1" are added to TPC3 from the time the scheduling was started to the time period T1 has elapsed. When period T1 has elapsed, the value of the TPC3 is compared with TPC4 that is a predetermined threshold, and if the number of times the command to increase transmission power was issued until the lapse of period T1 exceeds a certain threshold, it is determined that the increase in the transmission power during a fixed period of time is too large. Thereafter, TPC command TPC2 to be output to TPC multiplex circuit 15 is made equal to 2, issuing a command to reduce the transmission power. Thus, significant increase in the transmission power during the scheduling is prevented.

In this way, when the increase in the transmission power of a mobile station that is performing high-speed packet transmission during a fixed period of period exceeds the threshold for increase, or when the amount of interference in the entire cell exceeds the threshold for the amount of interference, TPC bit generating circuit 14 sets TPC2=0, issuing TPC command TPC2 to direct TPC multiplex circuit 15 to reduce the transmission power, without using TPC command TPC1 from SIR estimation circuit 12. As a result, it is possible to limit the increase in the transmission power of a mobile station that is performing high-speed packet transmission within a fixed period of time, and if the amount of interference exceeds the predetermined threshold for the amount of interference, to reduce the transmission power, thus keeping the amount of interference in the cell constant. Further, the use of this control in the conventional closed loop transmission power control provides more quick control, allowing the threshold for interference to be set at a higher level without having a larger margin. This leads to improvement in the use efficiency of the cell.

The present embodiment has been described by applying the present invention to a CDMA base station system employing a W-CDMA communication scheme as a communication scheme with mobile stations. However, the present invention should not be limited thereto, and can also be applied to other CDMA base stations that perform uplink transmission power control using spectrum spread communication with mobile stations, other than CDMA communications scheme.

While a preferred embodiment of the present invention has been described using specific terms, such description is for illustrative purposes only, and it is to be understood that changes and variations may be made without departing from the spirit or scope of the following claims.

What is claimed is:

1. A CDMA base station for controlling uplink transmission power from mobile stations, said station comprising:

a signal power estimation circuit for estimating an uplink signal power based on a pilot signal contained in an uplink signal from a mobile station;

a noise estimation circuit for estimating a noise power of the uplink signal based on the pilot signal;

a Signal to Interference Power Ratio (SIR) estimation circuit for estimating SIR of the uplink signal, based on the uplink signal power estimated by said signal power estimation circuit and the noise power estimated by said noise estimation circuit, comparing the estimated SIR of the uplink signal with a predetermined target SIR and outputting the result of comparison as a Transmission Power Control (TPC) command;

a noise comparator for comparing the noise power estimated by said noise estimation circuit as an amount of interference in an entire cell, with a predetermined threshold for the amount of interference and outputting the result of comparison;

a TPC bit generating circuit for determining, based on a scheduling signal supplied from a packet communication circuit, whether or not a mobile station whose transmission power control is to be made performs high-speed packet communication; when it is determined that the mobile station does not perform high-speed packet communication, outputting the TPC command from said SIR estimation circuit as it is as a final TPC command; when it is determined that the mobile station performs high-speed packet communication, outputting a TPC command to reduce the transmission power as a final TPC command if the result of comparison from said noise comparator indicates that the current amount of interference in the entire cell is greater than the threshold for the amount of interference; if the result of comparison from said noise comparing circuit indicates that the current amount of interference in the entire cell is equal to or lower than the threshold for the amount of interference, counting the TPC command to increase the transmission power, for a fixed period of time, from among the TPC commands output from said SIR estimation circuit, to thereby calculate transmission power increase within the fixed period of time; when the transmission power increase exceeds a predetermined threshold for increase, outputting a TPC command to reduce the transmission power as a final TPC command; and when the transmission power increase has not exceeded the threshold for increase, outputting the TPC command from said SIR estimation circuit as it is as a final TPC command; and a TPC multiplex circuit for multiplexing the final TPC command generated by said TPC bit generating circuit with a downlink signal to be transmitted to the mobile station.

2. A method of controlling uplink transmission power from mobile stations performed in a CDMA base station, said method comprising the steps of:

estimating an uplink signal power based on a pilot signal contained in an uplink signal from a mobile station;

estimating a noise power of the uplink signal based on the pilot signal;

estimating Signal to Interference Power Ratio (SIR) of the uplink signal, based on the estimated uplink signal power and the estimated noise power, comparing the estimated SIR of the uplink signal with a predetermined target SIR and generating the result of comparison as a Transmission Power Control (TPC) command;

comparing the estimated noise power as an amount of interference in an entire cell, with a predetermined threshold for the amount of interference and outputting the result of comparison;

determining, based on a scheduling signal supplied from a packet communication circuit, whether or not a mobile station whose transmission power control is to be made performs high-speed packet communication;

when it is determined that the mobile station does not perform high-speed packet communication, outputting the TPC command from said SIR estimation circuit as it is as a final TPC command;

when it is determined that the mobile station performs high-speed packet communication, outputting a TPC command to reduce the transmission power as a final TPC command if the result of comparison indicates that the current amount of interference in the entire cell is greater than a threshold for the amount of interference;

if the result of comparison indicates that the current amount of interference in the entire cell is equal to or lower than the threshold for the amount of interference, counting the TPC command to increase the transmission power, for a fixed period of time, from among TPC commands generated, to thereby calculate transmission power increase within the fixed period of time;

when the transmission power increase exceeds a predetermined threshold for increase, outputting a TPC command to reduce the transmission power as a final TPC command;

when the transmission power increase has not exceeded the threshold for increase, outputting the TPC command from said SIR estimation circuit as it is as a final TPC command; and multiplexing the final TPC command generated with a downlink signal to be transmitted to the mobile station.

3. A CDMA base station for controlling uplink transmission power from mobile stations, said station comprising: a signal power estimation circuit for estimating an uplink signal power based on a pilot signal contained in an uplink signal from a mobile station; a noise estimation circuit for estimating a noise power of the uplink signal based on the pilot signal; a Signal to Interference Power Ratio (SIR) estimation circuit for estimating SIR of the uplink signal, based on the uplink signal power estimated by said signal power estimation circuit and the noise power estimated by said noise estimation circuit, comparing the estimated SIR of the uplink signal with a predetermined target SIR and outputting the result of comparison as a Transmission Power Control (TPC) command; a noise comparator for comparing the noise power estimated by said noise estimation circuit as an amount of interference in an entire cell, with a predetermined threshold for the amount of interference and outputting the result of comparison; a TPC bit generating circuit for generating a TPC bit according to whether a mobile station, whose transmission power is to be controlled by the CDMA base station, performs high-speed packet communication, wherein, when it is determined that the mobile station does not perform high-speed packet communication, the TPC bit generating circuit outputs the TPC command from said SIR estimation circuit as it is as a final TPC command, and when it is determined that the mobile station performs high-speed packet communication, the TPC bit generating circuit outputs a TPC command according to the current amount of interference in the entire cell, wherein, when it is determined that the mobile station performs high-speed packet communication, if the result of comparison from said noise comparator indicates that the current amount of interference in the entire cell is greater than the threshold for the amount of interference, reducing the transmission rower through the TOP command, and, if the result of comparison from said noise comparing circuit indicates that the current amount of interference in the entire cell is equal to or lower than the threshold for the amount of interference, increasing the transmission rower through the TOP command, wherein, if the increase in transmission rower through the TOP command during a predetermined fixed period of time exceeds a predetermined threshold for increase, reducing the transmission power as a final TPC command, and if the increase in transmission power through the TOP command during a predetermined fixed period of time does not exceed the threshold for increase, outputting the TPC command from said SIR estimation circuit as it is as a final TPC command.

* * * * *

UNITED STATES PATENT AND TRADEMARK OFFICE
CERTIFICATE OF CORRECTION

PATENT NO. : 7,684,819 B2
APPLICATION NO. : 11/350874
DATED : March 23, 2010
INVENTOR(S) : Shinya Muraoka It is certified that error appears in the above-identified patent and that said Letters Patent is hereby corrected as shown below:

Column 10, Line 20, delete "TOP" and insert --TPC--;

Column 10, Line 26, delete "TOP" and insert --TPC--;

Column 10, Line 27, delete "TOP" and insert --TPC--;

Column 10, Lines 25 and 27, delete "rower" and insert --Power--;

Column 10, Line 31, delete "TOP" and insert --TPC--.

Signed and Sealed this

Fourteenth Day of September, 2010

David J. Kappos
*Director of the United States Patent and Trademark Office*